Oct. 14, 1969 M. F. LAMORTE ET AL 3,471,923

METHOD OF MAKING DIODE ARRAYS

Filed Dec. 9, 1966

INVENTORS
Michael F. Lamorte &
Paul Nyul
BY Arthur I. Spechler
Attorney

United States Patent Office 3,471,923

Patented Oct. 14, 1969

3,471,923

METHOD OF MAKING DIODE ARRAYS

Michael F. Lamorte, Princeton, and Paul Nyul, Flemington, N.J., assignors to RCA Corporation, a corporation of Delaware Filed Dec. 9, 1966, Ser. No. 600,465
Int. Cl. B01j *17/00*; H01l *15/02*
U.S. Cl. 29—572 7 Claims

ABSTRACT OF THE DISCLOSURE

A method of making an improved laser diode array, including a plurality of light emitting PN junctions oriented in a single plane, includes the steps of forming a stack including an insulating substrate, a lower metal contact layer, an alloying preform, a layer-like diode wafer, another alloy preform and an upper metal contact layer; heating the stack to form an integral structure; and then forming slots in the integral structure which extend through the stack to a location at the lower contact layer.

This invention relates generally to semiconductor devices, and more particularly to improved diode arrays and novel methods of making them. The improved diode arrays and novel methods of making them are particularly useful for providing improved light-emitting diode arrays of the GaAs (gallium arsenide) type.

Injection-type lasers, such as GaAs lasers, are relatively low power output devices in contrast to lasers of the insulator type. The injection-type laser, however, has many advantages, such as smaller size, greater ruggedness, lower cost, and easier modulation capability over the insulator-type laser. Consequently, means have been sought to increase the power output of the injection-type laser.

It has been proposed to increase the power output of injection-type lasers by providing an array of laser diodes connected for simultaneous operation. Prior-art laser diode arrays, however, are relatively difficult and expensive to manufacture because the laser diodes are very small and difficult to arrange in an optically aligned array. Good optical alignment of a laser beam, derived from a plurality of individually mounted laser diodes on a substrate, is extremely difficult to achieve, and the expense of handling individual laser diodes whose longest dimension is less than 15 mils is relatively great.

It is a general object of the present invention to provide improved diode arrays and novel method of making them.

Another object of the present invention to provide a novel method of making an array of diodes that are in good optical alignment to provide a combined beam of greater brightness than possible with diodes in prior-art arrays.

Still another object of the present invention is to provide a novel method of making light-emitting diodes at a relatively lower cost than possible by prior-art methods.

Briefly stated, the improved diode arrays are made by novel methods wherein layer-like elements of different materials are formed into a laminar stack; the stack is heated to form an integral structure; and slots are formed in the integral structure to provide a plurality of diodes mounted on at least one of the layer-like elements.

In a preferred embodiment of the novel method, the laminar stack is formed from a substrate layer of insulating material, a lower metal contact layer, a layer-like diode wafer having opposed metallized major contact surfaces, and an upper metal contact layer, in the order named. Metal alloying means, preferably in the form of layer-like preforms, are disposed between each of the opposed metallized major surfaces of the diode wafer and the adjacent lower and upper metal contact layers when the stack is formed so that the stack becomes an integral structure when subsequently heated. A plurality of slots are formed in the integral stack to provide a plurality of diodes mounted on the substrate layer of insulating material in excellent optical alignment. If individual diodes are desired, the slots are extended through the entire stack, severing each diode from the stack.

In another embodiment of the improved diode array, the upper and lower metal contact layers extend beyond the diode wafer, and at least one of these metal contact layers on each diode is a malleable metal so that it can be bent for direct electrical connection to an adjacent metal contact layer on an adjacent diode to connect adjacent diodes electrically in series.

The improved diode arrays and novel methods of making them will be described in detail with reference to the accompanying drawing, in which similar parts in different figures of the drawing are designated by similar reference characters, in which a reference character including both a number and a letter designates a portion of a larger part designated only by the number, and in which.

Figure 1:
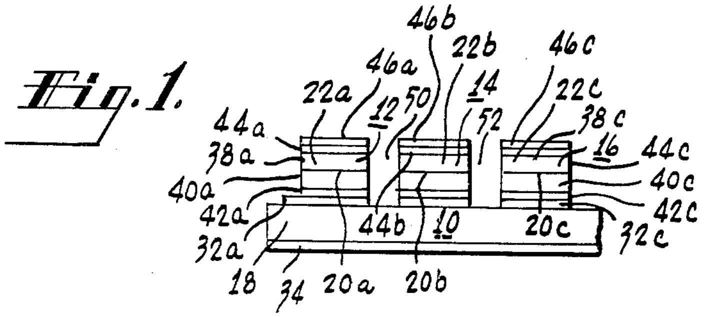
FIG. 1 is a fragmentary front elevational view of an improved diode array.
Figures 2, 3, 5:
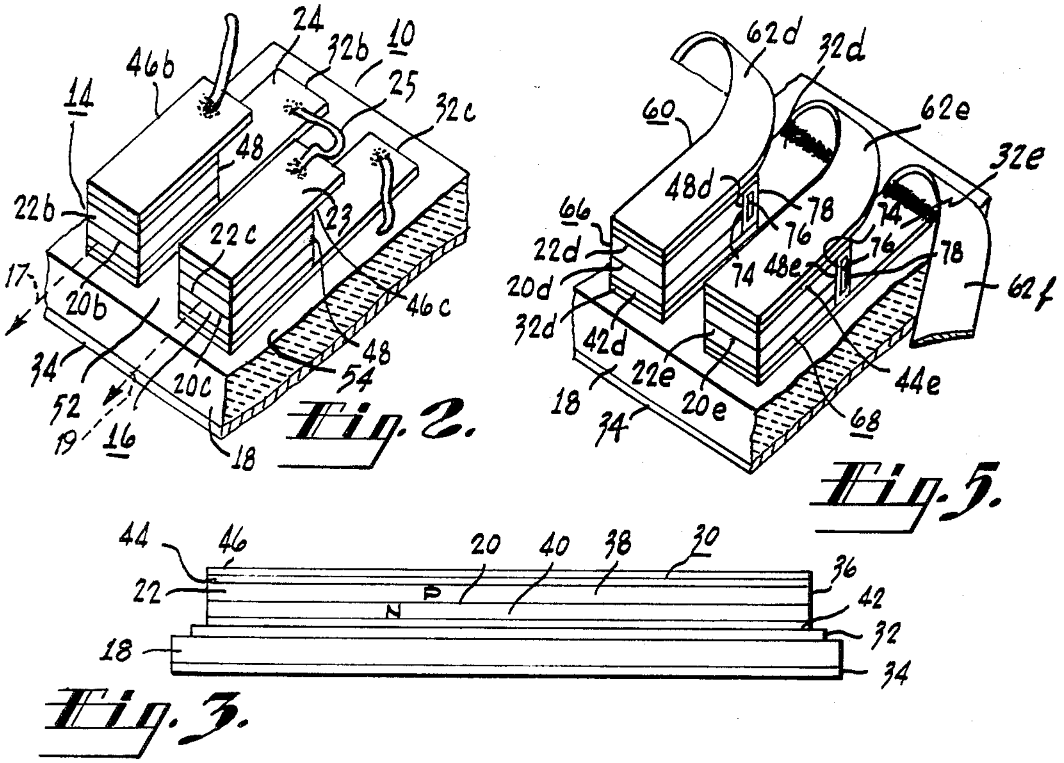
FIG. 2 is a fragmentary perspective view of the improved diode array shown in FIG. 1.
FIG. 3 is a front elevational view of a laminar stack of layer-like elements used in the novel methods of making the diode array shown in FIG. 1.
FIG. 5 is a fragmentary perspective view of another embodiment of the improved diode array.

Referring now to FIGS. 1 and 2 of the drawing, there is shown an improved diode array 10 comprising a plurality of similarly oriented diodes 12, 14 and 16, for example, mounted, in a spaced-apart relationship, on a substrate 18 of electrically insulating material. While only 3 diodes are shown in the array 10 for illustrative purposes, the array 10 may contain as many diodes as are desired and practical. Each of the diodes 12–16 is a light-emitting device, such as a laser of the GaAs type, adapted to emit a coherent beam of light (e.g. beams illustrated by dashed arrows 17 and 19 in FIG. 2) when current of at least a threshold value is caused to flow through it, in a manner well known in the art. Currents of less than threshold value produce non-coherent beams of light.

By the term "light," as used herein, is meant electromagnetic radiation in either the visible and/or invisible regions of the electromagnetic spectrum.

Since each of the diodes 12–16 is substantially similar to the other in structure, details of the structure of only the diode 12 will now be described. Analogous parts in the diodes 12–16 will subsequently be designated by the same reference numerals, but these parts will have a different reference letter added to the reference numerals in each of the diodes.

The diode 12, for example, consists of layers of P type and N type semiconductor material 38*a* and 40*a*, respectively, having a PN junction 20*a* between them. The N type layer 40*a* is alloyed to a lower metal contact layer 32*a* by means of an alloy-forming preform 42*a*. The lower metal contact layer 32*a* is a metal coating on the substrate 18. The P type layer 38*a* is alloyed to an upper metal contact layer 46*a* by means of an alloy-forming preform 44*a*.

The PN junctions 20*a*–20*c* of the diodes 12–14, respectively, lie in substantially the same plane. The diodes 12–16 also have cleaved or optically polished front end surfaces 22*a*–22*c*, respectively, that lie in a plane which is substantially perpendicular to the plane defined by the PN junctions 20*a*–20*c*. Accordingly, the beams of light emitted from each of the diodes in the array 10 will be in substantially parallel alignment when current of at least a threshold value is caused to flow through the diodes 12–16.

The diodes 12–16 in the diode array 10 may be connected either in parallel or in series. A series connection of the diodes is usually preferred because of the relatively large values of current required for each of the diodes to lase. Thus, an upper terminal 23 of the diode 16 is electrically connected to a lower terminal 24 of the diode 14, by an electrical conductor 25 and solder, as shown in FIG. 2. The other diodes (not shown) in the array 10 are similarly connected.

Figure 4:
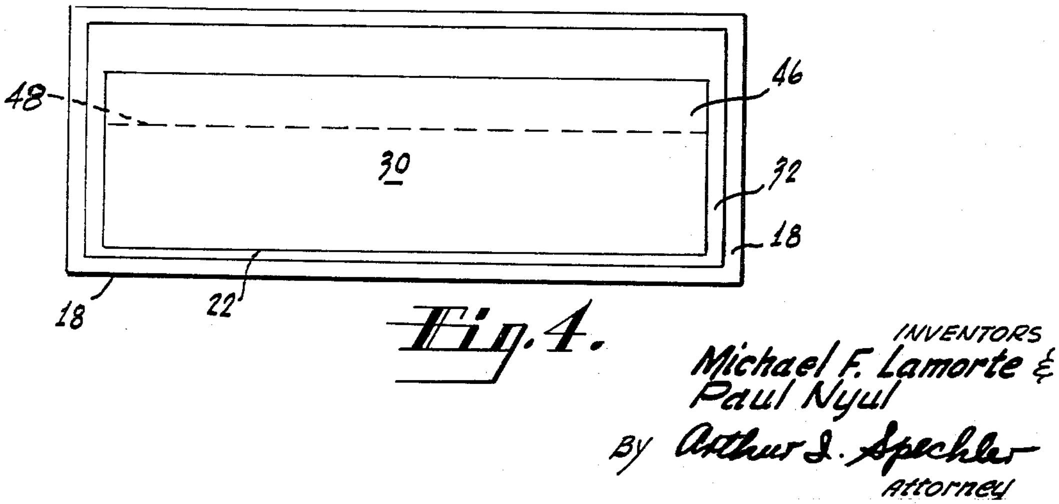
FIG. 4 is a plan view of the laminar stack shown in FIG. 3.

Referring now to FIGS. 3 and 4 of the drawing, there is shown a stack 30 of layer-like elements of different materials used in a novel method of making the improved diode array 10. The stack is formed on a first layer comprising the substrate 18 of electrically insulating material. The substrate 18 should also be a good conductor of heat. Materials such as beryllium oxide, aluminum oxide, and silicon dioxide, are suitable materials for the substrate 18.

The upper major surface of the substrate 18 is coated with a metal whose coefficient of expansion is compatible with that of the substrate 18. Where the substrate 18 is of beryllium oxide, a lower metal contact coating or layer 32 of the substrate 18 may be an alloy of molybdenum and manganese, "Moly-Manganese." The layer 32 will subsequently form the lower contacts **32*a*–32*c* of the diodes 12–16, respectively, in the diode array 10. The layer 32 need not extend to the edges of the substrate 18, as shown in FIG. 4. A metal coating or layer 34 of "Moly-Manganese" is also formed on the lower major surface of the substrate 18 to provide means for attaching the substrate 18 to a suitable heat sink, if so desired. A typical thickness of the substrate 18 is about 20 mils and the thickness of each of the layers 32 and 34 is between 1 and 2 mils. The substrate 18** may be 350 mils long and 50 miles wide.

A layer-like diode wafer 36 of semiconductor material, capable of functioning as a light-emitting diode, is electrically connected to the layer 32, as by alloying. The diode wafer 36 comprises a layer 38 of P type conductivity on a layer 40 of N type conductivity, having a PN junction 20 between them. A layerlike metal alloy forming preform 42, such as a layer of lead or indium, of substantially the same length and width as the diode wafer 36 is placed on the metal layer 32, and one major surface of the diode wafer 36 is placed on the preform 42. An upper metal contact layer 46 that will form upper terminals **46*a*–46*c* for the diodes 12–16, respectively, in the array 10, is also electrically connected to the diode wafer 36, as by alloying. To this end, a layer-like metal alloy forming preform 44, similar to the preform 42, is placed on the upper metallized major surface of the diode wafer 36, and the upper metal contact layer 46, is placed on the preform 44. The layer 46 may be of gold and is somewhat wider than the diode wafer 36** for the purposes hereinafter appearing.

The diode wafer 36 is preferably a rectangular wafer, between about 3 and 4 mils in thickness, about 12 mils wide, and about 350 mils long. The front end surface 22 of the diode wafer 36 is one that has been previously cleaved (or polished) so as to provide a surface from which light can be emitted from the PN junction 20. The rear end surface 48 of the diode wafer 36 should also have been previously cleaved (or polished) so that diodes subsequently to be cut from the wafer 36 will form laser cavities.

To form the stack 30 of layer-like elements into an integral structure, the stack 30 is heated in an inert ambient, such as nitrogen or forming gas, to a temperature at which the preforms 42 and 44 alloy with the metals adjacent to them. For example, if the preforms 42 and 44 are of lead, the stack 30 is heated to a temperature of about 280° C. until the preforms 42 and 44 melt, that is, for about five seconds.

The stack 30, now an integral structure, is formed into a plurality of diodes by forming a plurality of slots through the diode wafer 36 and the metal contact layers 32 and 46 that have been alloyed previously to the opposed major surfaces of the diode wafer 36 to form contact terminal means. Thus, a plurality of parallel slots 50, 52, and 54, spaced an equal distance from each other, are formed through the stack 30. The slots extend all the way to the substrate 18 to provide the diodes 12–16 separated from each other and oriented similarly on the insulating substrate 18. The slots 50–54 may be formed by chemical etching means or by a multiple wire cutting machine, for example, in a manner well known in the art. The slots 50–54 are transverse to (preferably perpendicular to) the PN junction 20 and are about 1 mil in width.

When the diode wafer 36 is of GaAs, each of the diodes 12–16 is about 3½ mils thick, 3 mils wide, and about 12 mils long. When a current of a threshold value is applied to the diodes 12–16 so that the current travels in a direction in which the diodes are forward biased, beams of coherent light are emitted from the PN junctions **20*a*–20*c*, respectively, and the beams of light so emitted are substantially parallel to each other, thereby providing a composite coherent beam whose intensity is the sum of the intensities of the beams of the diodes in the array 10. Because of the novel method of making the array 10**, the beams of light emitted from the diodes in the array are in substantially perfect parallel alignment.

Referring now to FIG. 5, there is shown a diode array 60, made in substantially the same manner as the diode array 10, shown in FIGS. 1 and 2. The diode array 60 differs from the diode array 10, however, in that a relatively much wider upper metal contact layer than the upper metal contact layer 46 is used in forming the stack. Hence, upper terminals **62*d* and 62*e* of adjacent diodes 66 and 68, for example, in the diode array 60 can be used directly as circuit interconnecting means, without resorting to separate conductors. This interconnecting function is possible because the terminals 62*d* and 62*e* are of a malleable metal, such as gold, and are easily bent. Thus, the upper terminal 62*e* of the diode 68 is connected directly to the lower terminal 32*b* of the adjacent diode 66**, as by a soldered connection.

In the diode array 60, the rear end surfaces **48*d* and 48*e* of the diodes 66 and 68, respectively, are covered with totally light-reflective means. Thus, an insulating layer 74, such as of silicon dioxide, is deposited on the rear end surfaces 48*d* and 48*e*, a layer 76 of a reflective metal, such as gold, is deposited on the insulating layer 74, and a protective layer 78 of insulating material, such as silicon dioxide, is deposited on the layer 76. The insulating layer 74 and the protective layer 78 should surround the layer 76 to prevent the latter from shorting the diode. Consequently, the diodes 66 and 68 of the diode array 60 will emit coherent light only from the front end surfaces 22D and 22*e*, respectively, when a threshold current passes through them in a forward biased direction. The totally light-reflective means, comprising the layers 74–78, is preferably disposed on the diode wafer 36** prior to forming the stack.

The novel methods of forming the improved diode arrays can also be utilized to form a plurality of (separated) single diodes at relatively low cost. To form a plurality of separated diodes from an integral laminar stack 30, for example, the aforementioned slots 50–54 are not terminated at the substrate 18, but they are extended through both the insulating substrate 18 and the lower metallized layer 34. Also, instead of using the insulating substrate 18 as the first layer from upon which to form the stack 30, a sheet of metal, equivalent to the lower metal contact layer 32, may be used as the first layer. Under the latter conditions, individual slices of the stack 30 may be cut by any suitable means, each slice being separate diode with a pair of opposed metalized contact layers alloyed thereto.

What is claimed is:

1. A method of making an array of a plurality of semiconductor diodes comprising the steps of forming a laminar stack of layer-like elements comprising, in the order named, a lower metal contact layer, a first metal alloying layer, a semiconductor wafer having a PN junction and a pair of opposed major surfaces, a second metal alloying layer, and an upper metal contact layer, heating said stack to form an integral structure wherein said upper and lower metal contact layers are alloyed to said opposed surfaces, respectively, of said wafer to provide contacts therefor, and forming a plurality of slots in said stack, said slots beginning in and through said upper layer, extending transversely through said PN junction, and terminating at said lower contact layer.

2. A method of making an array of a plurality of diodes as defined in claim 1 wherein said laminar stack is formed on a substrate of insulating material, said lower metal contact layer being on said substrate, and said slots are extended through said lower contact layer, whereby to form said array of a plurality of diodes mounted on said substrate.

3. A method of making an array of a plurality of diodes as defined in claim 2 wherein said opposed surfaces of said wafer in said stack are metalized, said first and said second metal alloying layers are preforms comprising lead or indium, said slots are formed parallel to each other, and said wafer has a front end surface lying in a plane that is transverse to said PN junction, whereby said diodes emit beams of light that are parallel to each other when current of a threshold value is passed through them in a forward biased direction.

4. A method of making an array of a plurality of diodes comprising forming a laminar stack of layer-like elements by:

providing a first layer comprising a substrate of insulating material having a pair of opposed major surfaces and a lower metal contact layer on one of said major surfaces, placing a first alloy forming material on said lower metal contact layer, placing a diode wafer, comprising a PN junction and a pair of opposed metalized major contact surfaces on said first alloy forming material, one of said contact surfaces being in contact with said first alloy forming material, placing a second alloy forming material on the other of said contact surfaces of said diode wafer, placing an upper metal contact layer on said second alloy forming material, heating said stack in an inert atmosphere until said first and said second alloy forming materials alloy with adjacent metals and said stack becomes an integral laminar structure, and forming a plurality of slots in said integral laminar structure, each of said slots extending from said upper metal contact layer, transversely toward and through said PN junction, and through said lower metal contact layer on said first layer, whereby to form said array of a plurality of diodes mounted on said first layer of insulating material.

5. A method of making an array of a plurality of diodes as defined in claim 4, wherein said substrate of insulating material comprises beryllium oxide, and said lower metal contact layer comprises an alloy of molybdenum and manganese.

6. A method of making an array of a plurality of diodes as defined in claim 4, wherein each of said diodes is adapted to produce a beam of light when current of at least a threshold value passes through it, each of said diodes has a front end surface from which said beam is emitted, said PN junctions lie in substantially one plane, and said front end surfaces define another plane that is substantially perpendicular to said one plane, whereby said beams from said diodes are in substantially parallel alignment.

7. A method of making an array of a plurality of semiconductor diodes as recited in claim 1, wherein said lower metal contact layer is formed of malleable material and is substantially wider in relative lateral extent than the remainder of the stack, including the further steps of bending said lower metal contact layer into contact with the upper metal contact layer of an adjoining diode and securing it in electrical connection thereto.

References Cited

UNITED STATES PATENTS

| | | | |
|---|---|---|---|
| 2,801,375 | 7/1957 | Losco. | |
| 2,865,082 | 12/1958 | Gates | 29—589 X |
| 3,152,939 | 10/1964 | Borneman et al. | |
| 3,193,418 | 7/1965 | Cooper et al. | |
| 3,341,937 | 9/1967 | Dill | 29—583 |

OTHER REFERENCES

"SCP and Solid State Technology," November 1964, pp. 33–37.

PAUL M. COHEN, Primary Examiner

U.S. Cl. X.R.

29—573, 583, 590, 591; 313—108; 331—94.5